United States Patent Office 3,660,501
Patented May 2, 1972

---

3,660,501
METAL-ORGANIC COMPOUNDS
Aina Lisbeth Abramo, Rolf Bjorklund, Bernt Borretzen, Knut Gunnar Olsson, and Bertil Sundbeck, Malmo, Sweden, assignors to AB Ferrosan, Malmo, Sweden
No Drawing. Filed Dec. 22, 1969, Ser. No. 887,336
Claims priority, application Great Britain, Dec. 24, 1968, 61,474/68
Int. Cl. C07c *43/22*
U.S. Cl. 260—613 D          7 Claims

ABSTRACT OF THE DISCLOSURE

The present invention relates to new metal-organic compounds derived from halogenated phenols. The main idea of the invention is that the phenol group of the metal-organic compounds of the invention is protected by an acetal group and that the halogen has been reacted to form a conventional metal-organic compound. The metal-organic compounds of the invention are especially adapted to be used in syntheses to introduce a phenol group into a molecule. The main advantage is that the protecting group in the form of an acetal group very easily can be removed in a subsequent conversion to form the free phenol or the phenol esters.

---

The new metal-organic compounds of the invention are represented by the general formula

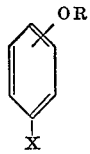

I wherein X is a group making the compound a metal-organic one, especially a magnesium containing group, preferably an Mg-halogen group and more preferably MgBr or X is an alkali metal, preferably Li, and wherein R represents an acetal group serving as a protecting group and having the general formula

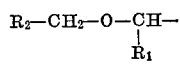

II wherein $R_1$ and $R_2$ which may be identical or different represent hydrogen or alkyl groups having from 1 to 3 carbon atoms, the acetal group R being in p- or m-position relative to the group X.

The object of the new metal-organic compounds of Formula I is to use these as intermediates in syntheses to introduce a phenol group into a molecule whereby the protecting group in the form of an acetal group very easily can be removed in a subsequent conversion to form the free phenol.

Other protecting groups, e.g. the methyl group, have previously been used in the syntheses in question to introduce phenol groups but said group has the disadvantage of being difficult to remove. The advantages being obtained by the metal-organic compounds containing the protecting group R of Formula II according to the invention are the following:

(1) The metal-organic compounds of Formula I are easily and cheaply prepared.
(2) Being metal-organic the compounds of Formula I will react with substances containing C=O groups, e.g. with esters, acid chlorides, ketones and aldehydes, nitriles, epoxides and compounds containing reactive halogens, e.g. α-haloketo compounds. The metal-organic compounds are also added to activated double bonds.
(3) In the compounds obtained by reacting the metal-organic compounds of Formula I with compounds containing the above-mentioned groups a removal of the acetal protecting group will occur without difficulties with the regeneration of the free phenol group.

The new metal-organic compounds of the invention are of special value when the compounds synthesized according to (3) above do not withstand the reaction conditions being necessary e.g. for the removal of methyl groups, i.e. do not withstand the treatment with potassium hydroxide in ethanol at 200° C. or the action of boiling 60% hydrobromic acid or the action of pyridine hydrochloride at 200° C. or the action of $AlBr_3$ in boiling nitrobenzene.

The metal-organic Grignard compounds of Formula I can e.g. be prepared in a way known per se by reacting protected phenols having the general formula

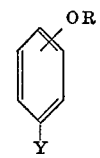

III wherein R has the above-mentioned meaning and Y represents halogen, preferably bromine, with magnesium in a suitable solvent. The reaction may be induced by catalysts, e.g. $J_2$, $BrCH_2CH_2Br$ or $HgCl_2$. Preferred solvents are tetrahydrofurane (named THF in the following), dialkyl ethers or mixtures of THF with dialkyl ethers.

The reaction is easily started by heating and upon completion of the reaction the solution may be boiled for ½ hour. The solution can be filtered or be used directly as such.

The protected phenols of Formula III are synthesized in a known manner e.g. from p-bromophenols and α-chloroalkyl ethers, e.g. α-chloromethyl ether, or alkylvinyl ethers, e.g. ethylvinyl ether, methylvinyl ether, butylvinyl ether or i-butylvinyl ether.

It is generally accepted that a Grignard compound can be described by a so-called Schlenck equilibrium

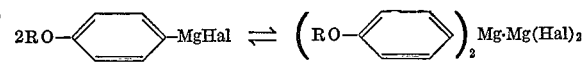

Ebullioscopic and electrolytic conductance measurements indicate even other associated molecules in the equilibrium depending on the nature of the molecule and the solvent, the equilibrium lying now to the left now to the right in the above-mentioned reaction. If the solvent is an ether, two moles of this acting as a Lewis base are associated with one mole of the Grignard compound, which is a Lewis acid, to form a complex with the formula

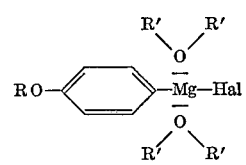

wherein R has the above-mentioned meaning, Hal represents halogen and R' represents alkyl groups which may be connected to a ring.

However, as most of these compounds have a transistory existence, the reaction of the Grignard solution with reactive groups, e.g. the C=O group, is independent of the state of the equilibrium.

For the above-mentioned reasons the Grignard complex will be represented by the formula

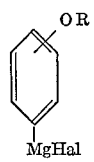

The compound is assayed by titration in a conventional manner, e.g. an aliquot part of the solution is added to 0.1 N HCl and the remaining HCl is titrated with 0.1 N NaOH against methyl red. The difference obtained is equivalent to the amount of reactive Mg (representing the Mg—C bond).

In far infrared the aryl-Mg bond has a characteristic absorption band at 340–400 cm.$^{-1}$ (IR-spectra obtained on a Perkin-Elmer 421 spectrometer).

Conventional colour tests for the detection of arylmagnesium compounds in the Grignard solutions may be carried out, e.g. Gilman's colour tests I and II and colour test III described below.

(I) The Grignard solution forms a green colour upon reaction with 1% of Michler's ketone in benzene, hydrolysis with water and oxidation with 0.2% iodine in acetic acid.
(II) The Grignard solution is mixed with a 1% solution of triphenylbismuth dichloride in dry benzene. The arylmagnesium compound gives immediately a pale purple colour.
(III) The Grignard solution gives a red colour when mixed with a 10% solution of methyl benzoate in ether and upon hydrolysis with 10% hydrochloric acid in ethanol. Upon addition of a 10% NaOH solution the colour changes to a deep purple colour.

Even the reaction of the Grignard solution with carbon dioxide and hydrolysis to form m- or p-hydroxybenzoic acid justifies the above-mentioned formula.

In certain cases it may be advantageous to displace the Schlenck equilibrium by the precipitation of MgHal$_2$, e.g. with the aid of dioxane. In a solution of THF and dioxane then a substance corresponding to the formula

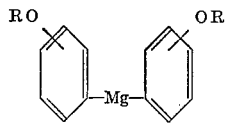

will remain. This will principally react in the same way as compounds having the formula

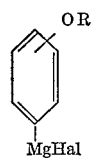

The solution will give no precipitation of MgHal$_2$ when stored in the cold.

In order to synthesiez lithium compounds of Formula I compounds of Formula III are preferably reacted with butyllithium or a dispersion of lithium in a suitable solvent, e.g. hexane or an ether.

Also in this case the formula of the lithium-organic compounds is complicated by association and addition of the solvent. However, the metal complex is best represented by the formula

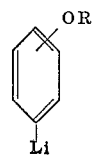

The same assays are performed for the lithium-organic compounds as for the Grignard solutions.

In addition to Li the alkali metals Na and K are used in the preparation of the metal-organic compounds of the invention. They are most easily prepared by reacting compounds of the formula

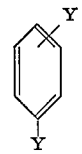

with an Na or K dispersion in benzene.

The high reactivity and then tendency to Wurz reaction will to some extent restrict their use to sterically very strongly hindered reactants. However, they can also be used in the synthesis of simplier substances since they easily react with

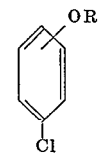

and then with MgCl$_2$ to form

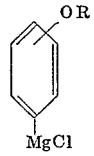

which is reacted in a conventional manner. In this way the use of the more expensive bromo compounds is avoided on a large scale.

Other metal containing groups X can also be used, e.g. such containing Hg, Cd, Be, Zn and Ca. These groups often serve to modify the effect of the Grignard compounds and the compounds in question are prepared from these, i.e. the more reactive ones from Grignard reagent and metal and the less reactive from Grignard reagent and a metal salt. A typically and especially useful metal-organic reagent which is less active than the Grignard reagent is the corresponding cadmium compound. This is prepared by the addition of anhydrous CdCl$_2$ to the Grignard reagent and is used immediately. The compounds in question are believed to have the composition ArCdHal or Ar$_2$Cd (Ar being aryl). The more reactive metals, e.g. Ca, can generally be replaced by Li.

As mentioned above the metal-organic compounds of the present invention can be used as intermediates in widely differing syntheses.

A great number of widely used and investigated compounds containing hydroxyphenyl groups, especially compounds with estrogenic, antiestrogenic and antifertility properties, are synthesized using the metal-organic compounds of the invention, e.g. symmetrical and unsymmetrical diphenyl ethenes and ethanes, triphenyl ethenes and ethanes and the corresponding ethanols, and phenylhydronaphthalenes.

Being metal-organic the compounds of Formula I will react, as already mentioned, with substances containing C=O groups, e.g. with esters, acid chlorides, ketones and aldehydes, nitriles, epoxides and compounds containing reactive halogens, e.g. α-halo-keto compounds. The metal-organic compounds are also added to activated double bonds. In this case there are striking differences in reaction rates between different metal-organic reagents as well as in their reactions with different reactants, and by variation of said conditions it is possible to react the metal-organic reagents selectively with different reactive groups.

Upon completion of the reaction through decomposition of the formed metal complex with water, weak acids, e.g. ammonium chloride solution, etc., the protecting group R can be removed with the aid of a diluted acid, e.g. hydrochloric acid.

Following these directions, p-hydroxydiphenyl alkenes having the general formula

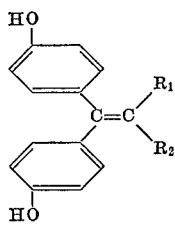

wherein $R_1$ and $R_2$ are lower alkyl groups which may be connected to an alicyclic ring, are synthesized e.g. in the following manner:

To a solution of p-ethoxyethoxyphenylmagnesium bromide in tetrahyrdrofurane and diethylether, a solution of an ester of dialkylacetic acids or cycloalkylcarboxylic acids is added. Thereupon the formed Grignard complex is decomposed and the acetal groups removed.

Some of these compounds have previously been synthesized using the Grignard reagent p-anisylmagnesium bromide [Miquel et al., J. Med Chem. 6 (1963), 774, U.S. Pats. 3,237,200; 3,406,209; 3,287,397].

However, the removal of the methyl groups at 200° C. with strong alkali is a violent treatment which gives by-products and low yields. Some compounds belonging to the classes of compounds in question cannot even be synthesized in this way.

Hydroxy substituted triphenyl ethenes are very easily synthesized from aliphatic α-halogen carboxylic esters and α-halogen ketones. Thus, 1,2-bis(p-hydroxyphenyl)-p-methoxypheyl-1-butene can be synthesized from p-methoxymethoxyphenylmagnesium chloride in tetrahydrofurane and α-chloro-p-methoxybutyrophenone in benzene. The methoxymethoxy groups are removed with hydrochloric acid in ethanol and the compound, very easily loosing one mole of water, can be fractionated by crystallization to form the cis and trans p-hydroxystilbenes (M.P. 120–122° C. and 140–143° C.), the trans compound being 100 times more estrogenic than the cis compound. Without using the Grignard compounds of the present invention with easily removable protecting groups it is very difficult to synthesize and investigate these susceptible compounds.

An α-alkyl or cycloalkylphenyl acetonitrile dissolved in benzene is added to a solution of m-butoxyethoxyphenylmagnesium chloride in dimethyl Cellosolve and is hydrolyzed to an α-(m-hydroxyphenyl)-β-alkyl-(or cycloalkyl)-β-phenylethylimine. These compounds are useful intermediates, which can be further hydrolyzed to the corresponding ketones, reduced to amines, etc.

A solution of 4-carbethoxycyclohexane carboxylic chloride in THF is added to a solution of p-methoxymethoxyphenylcadmium chloride in THF-ether. The metal complex is hydrolyzed with diluted ethanolic hydrochloric acid and gives then p-hydroxyphenyl - (4 - carbethoxycyclohexyl)-ketone being a valuable intermediate for further synthesis.

To a dispersion of sodium in benzene a solution of p-ethoxyethoxybromo benzene in benzene is added and then a solution of methyl 2,2,6-trimethylcyclohexane carboxylate. Upon decomposition of the metal complex bis-(p-hydroxyphenyl)-2,2,6-trimethylcyclohexylidene methane with a melting point of 195–197° C. can be isolated from the mixture.

The solutions of the metal-organic compounds of the invention containing non-consumed Mg as a residue can be used directly, the amount of consumed Mg being used as an assay of concentration. The solutions can also be filtrated using $N_2$ as a protecting gas and diluted to desired concentration. After titration an aliquot part can be used for synthesis.

The solutions can even be stored in a suitable solvent, e.g. THF, thus making the solution possible for commercial distribution.

The solutions of the metal-organic compounds of the invention also should be protected against moisture, air (oxygen) and in certain cases against light.

The invention is further illustrated by means of the following non-limiting examples.

EXAMPLE 1

Synthesis of p-ethoxyethoxyphenylmagnesium bromide 260 g. of Mg (1.08 g.-atom), 0.5 g. of iodine and about 2 litres of the solvent tetrahydrofurane-diethyl ether (2:3) were placed in a 10 litre 3-necked round flask. The apparatus was flushed with nitrogen. 250 g. (1 mole) of p-ethoxyethoxybromo benzene was dissolved in 1.8 litres of the solvent and ⅓ of this solution was added to the flask. The Grignard reaction was initiated by heating and without further heating, the rest of the p-ethoxyethoxybromo benzene was added at such a rate that the ether refluxed gently (10 minutes). Upon boiling for ½ hour, the solution was allowed to cool and was then filtered through a G3 glass filter under nitrogen pressure into a storage vessel which made it possible to siphon a fixed portion directly into a reaction flask. The volume was about 4 litres.

Assay.—5 ml. of the Grignard solution was added to 25 ml. of 0.1000 N HCl and the unreacted HCl was titrated with 0.1000 N NaOH against methyl red. 1 ml. typical absorption band in IR at 352 cm.$^{-1}$ characteristic for a p-alkoxyalkoxyarylmagnesium bond in ether-THF (Perkin-Elmer 421 spectrometer).

The solution give a green colour with Michler's ketone. Reacted with $CO_2$ the Grignard reagent gave p-hydroxybenzoic acid.

Use: Preparation of p-hydroxybenzoic acid-$C^{14}$.—A Grignard solution of 0.4 M p-ethoxyethoxyphenylmagnesium bromide was carbonated with $C^{14}O_2$ generated from about 400 mg. Ba$C^{14}O_3$ according to the conventional method described by Murray-Williams, Org. Synthesis With Isotopes, 1958, p. 86—benzoic-$C^{14}$ acid.

After the Grignard complex was decomposed with 5–10 drops of saturated ammonium chloride solution, the rest of the solvent was blown off by a stream of nitrogen and cautious heating. To the rest, dissolved in 5 ml. of 99% ethanol, 3 drops of conc. hydrochloric acid were added. The solution was boiled for 1 minute and cooled.

10 ml. of water was added and the solution was extracted with ether. The ether solution was washed with a saturated NaCl solution. After drying, the ether was evaporated and the residue was recrystallized from 5% ethanol.

ASSAY $BaCO_3$, 450.1 mg.—2.285 mmoles
Spec. act.—21.2 mc./mmoles
Grignard solution 12 ml., 0.42 mmole/ml.—4.95 mmoles
Crude product—301.5 mg.
Product after recryst.—298 mg. (2.16 mmoles)
Yield after recryst.—~95%
Yield according to radioactive measurement—94.3%

This synthesis would have been quite impossible without the use of a very easily removable protecting group.

EXAMPLE 2

Synthesis of p-ethoxyethoxyphenylmagnesium bromide in THF solution

A Grignard solution was synthesized using pure THF as solvent and analyzed as in Example 1. The solution was dispensed in 250 ml. flasks sealed with a Teflon covered silicon rubber plate and a screw cap. Desired volumes could be removed with a hypodermic syringe and used for assay or synthesis. The assay after 1 year at 20° C. showed that the content was still unchanged.

EXAMPLE 3

Synthesis of p-methoxymethoxyphenylmagnesium bromide

A Grignard solution was prepared from 25 g. of magnesium and 210 g. of p-bromomethoxymethoxy benzene in a mixture of 125 ml. of THF and 125 ml. of diethyl ether as described in Example 1. Upon completion of the reaction the solution was cooled with water.

Assay and use.—To the Grignard solution prepared as described above 50 g. of ethylcyclohexane carboxylate was added. The mixture was then boiled for two hours and cooled. The metal complex was decomposed with 150 ml. of water and 150 ml. of ether. The ethereal layer was separated, washed with water, dried over sodium sulphate and distilled at 200–201° C./0.01 mm. Hg.

The unreacted Mg was filtered off, washed with water and alcohol, dried and weighed. The rest 0.7 g. Mg indicated a yield of 95% of p-methoxymethoxyphenylmagnesium bromide.

The bis(p-methoxymethoxyphenyl) - cyclohexylidene methane formed in the distillation was hydrolysed with 250 ml. ethanol and 15 ml. of concentrated hydrochloric acid. After precipitation with water and recrystallization from ethanol bis(p-hydroxyphenyl) - cyclohexylidene methane having a melting point of 234–235° C. was obtained [Lit. 235–236° C. according to J. Med. Chem. 6 (1963) 774].

The purity of the Grignard reagent was also tested in the following way:

To a Grignard solution, prepared from 24 g. of magnesium and 210 g. of p-bromomethoxymethoxy benzene in 100 ml. of tetrahydrofurane and 150 ml. of ether, there was added in portions about 500 g. of $CO_2$ (as Dry Ice). The reaction mixture was left overnight, dissolved in 2 N sodium hydroxide, filtrated and neutralized with 2 N acetic acid. The precipitate obtained, p-methoxymethoxybenzoic acid, was filtered off, washed with water and recrystallized from 10% ethanol and dried. Ekv. weight by electromethric titr. 183.2 (theor. 182.17). Yield after recryst. 80%.

The p-methoxymethoxybenzoic acid obtained was dissolved in 5% ethanolic hydrochloric acid. The solution was boiled for 10 minutes and neutralized to pH 3 with NaOH. Most of the alcohol was evaporated and the precipitated p-hydroxybenzoic acid was filtered off, washed with water and recrystallized from 5% ethanol. The M.P. was 217–218° C.

Another Grignard solution in THF and diethyl ether was prepared as described above and filtered under nitrogen. The solvents were removed in a rotating evaporator flushed with nitrogen at 30 mm. Hg and 40° C. Then the residue was heated at a vacuum of 0.1 mm. Hg to 60° C. A part of the Grignard compound obtained was hydrolyzed with HCl, and Mg was assayed as magnesium-ammonium phosphate. Mg 10.1 percent (calc.) Mg 9.5% (found). This Grignard composition can be suspended in xylene and used for syntheses.

EXAMPLE 4

Synthesis of p-butoxyethoxyphenylmagnesium chloride in THF

To a boiling solution of 27 g. (0.1 mole) of p-butoxyethoxybromo benzene in 100 ml. of THF and 5.2 g. of Mg there was added for 30 hours 18.6 g. (0.1 mole) of ethylene dibromide dissolved in 100 ml. of THF. Upon completion of the reaction [2.3 litres (=94%) of ethylene was developed] the solution was filtered and titrated— assay 0.4 mmole/ml.

EXAMPLE 5

Synthesis of m-ethoxyethoxyphenylmagnesium bromide in THF

A Grignard composition was synthesized as in Example 1 using m-ethoxyethoxybromo benzene and pure THF as a solvent.

Assay.—Assayed by titration the solution contained 0.35 mmole/ml. The Gilman tests were positive. The IR abs. at 350 cm.$^{-1}$ was characteristic for the m-compounds.

EXAMPLE 6

Synthesis of p-i-butoxyethoxyphenylmagnesium bromide 22.4 g. of magnesium was reacted in an autoclave with 27 g. of p-i-butoxyethoxybromo benzene dissolved in 50 ml. of dimethyl-Cellosolve. After 24 hours shaking with steelballs at 125° C., the autoclave was cooled and the solution filtrated.

Assay.—The solution gave positive colour tests and the assay 0.01 mmole/ml.

EXAMPLE 7

Synthesis of p-ethoxyethoxyphenyllithium

To 3.84 g. (0.06 mole) of butyllithium dissolved in 40 ml. of n-hexane, there was added 7.35 g. (0.03 mole) of p-ethoxyethoxybromo benzene in 50 ml. of ether.

Use.—This solution is especially suitable for reaction with sterically hindered esters and ketones, e.g. methyl 2,6-dimethylcyclohexane carboxylate.

EXAMPLE 8

Synthesis of p-methoxymethoxyphenyllithium

To 1.4 g. of 30 percent lithiummetal dispersion dissolved in 50 ml. of ether in a 250 ml. round-bottomed flask fitted with separatory funnel, mechanical stirrer, reflux condenser and flushed with nitrogen, there was added 6.5 g. (0.03 mole) of p-methoxymethoxybromo benzene dissolved in 50 ml. of ether. The solution was stirred for 1 hour.

Assay and use.—An aliquot portion of the filtered solution (the volume was corrected with ether to 100 ml.) was added to an excess of 0.1 N HCl and back-titrated with 0.1 N NaOH, using phenolphthaleine as indicator. 1 ml. of the solution contained 0.25 mmole/ml. The rest of the solution was used to reaction with the sterically hindered p - methoxymethoxyphenyl-2-t-butylcyclohexyl ketone.

EXAMPLE 9

Synthesis of p-ethoxyethoxyphenylcadmium chloride

To a 0.5 M solution of p-ethoxyethoxyphenylmagnesium bromide prepared as described in Example 1, an equimolar amount of anhydrous cadmium chloride was added under ice cooling and stirring for 15 minutes. After the addition of $CdCl_2$ and negative Gilman colour test I reaction, the solution was ready for use, e.g. reaction with acid chlorides or esters to the corresponding ketone or a specific 1,2-addition to an α,β-unsaturated ketone.

EXAMPLE 10

Synthesis of bis(m-ethoxyethoxyphenyl)-magnesium

To a solution of m-ethoxyethoxyphenylmagnesium chloride in THF (Example 5) an excess of dioxane was added. Upon completion of the addition the solution was stored in a refrigerator for one week, centrifugated and decantated. Then it was free from inorganic Mg salt. The solution contained 0.2 mmole/ml. and gave a positive Gilman colour test reaction; absorption in IR at 355 cm.$^{-1}$.

What we claim is:

1. Metal-organic compounds represented by the general formula

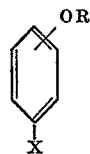  I wherein X is an Mg-halogen radical and wherein R is an acetal group having the general formula

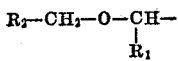  II wherein $R_1$ and $R_2$ are members selected from the class consisting of hydrogen and alkyl radicals having from 1 to 3 carbon atoms, the RO radical in Formula I not being in the o-position relative to the radical X.

2. Metal-organic compounds as set forth in claim 1 wherein $R_1$ and $R_2$ in Formula II are identical.

3. Metal-organic compounds as set forth in claim 1 wherein $R_1$ and $R_2$ in Formula II are non-identical.

4. Metal-organic compounds as set forth in claim 1 wherein X is MgBr.

5. The metal-organic compound

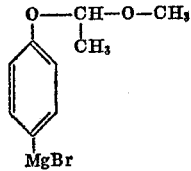

6. The metal-organic compound

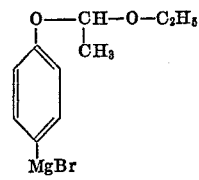

7. The metal-organic compound

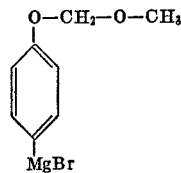

References Cited
UNITED STATES PATENTS

| | | | |
|---|---|---|---|
| 2,873,297 | 2/1959 | Ramsden | 260—613 D |
| 3,237,200 | 2/1966 | Barany | 260—613 D X |
| 3,287,397 | 11/1966 | Olsson et al. | 260—613 R X |

BERNARD HELFIN, Primary Examiner

U.S. Cl. X.R.

260—468 R, 521 R, 566 R, 613 A, 613 R, 619 A, 619 B